2,704,240

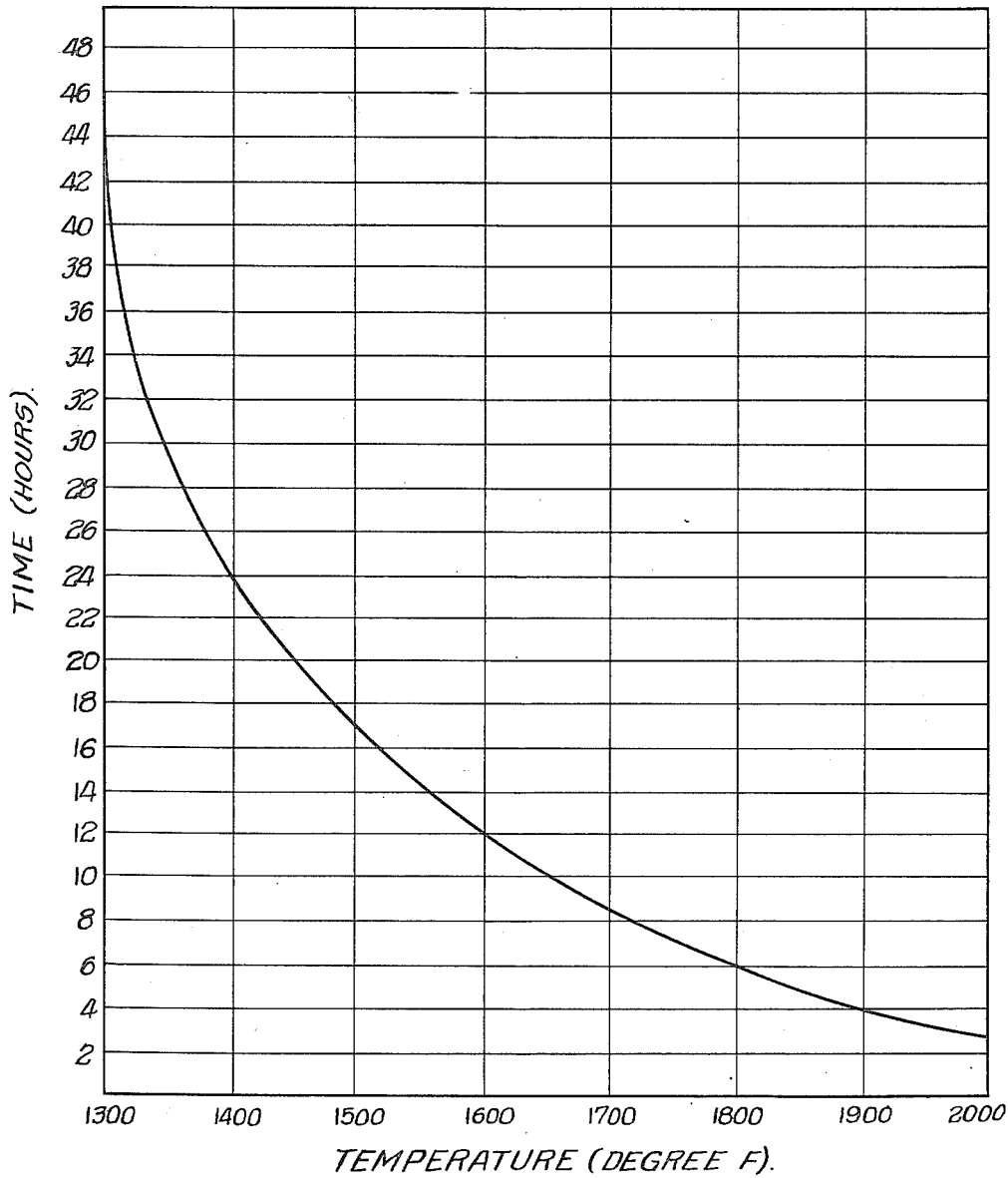

PROCESS OF PREPARING TUNGSTIC OXIDE FROM SINTERED MASSES CONTAINING TUNGSTEN CARBIDE

Howard S. Avery, Mahwah, N. J., assignor to American Brake Shoe Company, New York, N. Y., a corporation of Delaware Application October 23, 1951, Serial No. 252,760

5 Claims. (Cl. 23—140)

This invention relates to a process for converting sintered tungsten carbide, normally in the form of industrial scrap, into tungsten oxide from which, in turn, tungsten metal may be recovered, if desired. Such scrap metal is usually in the form of compact shapes of tungsten carbide and a suitable metallic bond, the latter usually being cobalt. Such material is conventionally produced by powder metallurgy techniques and is used, for example, for cutting tool tips and the like.

Such scrap material is of great hardness and toughness which characteristics make it almost impossible to crush or grind it into a form which is sufficiently divided so that suitable chemical reagents can bring about the separation of the elements present. The successful recovery of the valuable tungsten content by conventional methods is therefore difficult since both the mechanical reduction of the sintered masses and the chemical dissolution of the metal bond therein are impractical.

It is therefore an object of this invention to provide a relatively simple and economical process for the recovery of both the metal carbide, in the form of an oxide, and the bond metal in a form which may be easily recovered by well-known chemical reactions.

In accordance with the invention, it has been found that catastrophic oxidation of the sintered masses containing tungsten carbide and the metallic bond in a suitable furnace, containing atmospheric air, may be utilized to convert the hard compacts to a loose mass of friable material. This resultant friable material may be readily acted upon by suitable chemical reagents to separate the tungsten compound from the metallic bond. More specifically, the heated compact carbide shapes may be exposed for a suitable number of hours, depending upon the temperature utilized in the furnace, to the atmosphere to produce oxidation. This, in turn, causes them to disintegrate to form a bulky mass of oxide which can be readily reduced to powder.

The useful temperature range for the process has been found to be between approximately 1300° F. and 2000° F., with approximately 1600° F. to 1800° F. representing the preferred range. The preferred period of exposure for various temperatures in this oxidizing step has been found to be in accordance with the curve shown in the accompanying drawing which is in the form of a time-temperature chart for temperatures within the stated useful range. Thus by reference to the chart, shown in the drawings, the preferred time of treatment may be determined for any given temperature.

Although certain advantages are obviously obtained in the higher temperature regions, such as a reduction in the time required for the necessary oxidation, the upper limit of temperature is determined by the fact that the tungsten oxide tends to evaporate and be lost in the furnace atmosphere to an undesirable extent at temperatures above approximately 2000° C. This makes the process impractical at temperatures above that approximate limit. For example, a 5½ hour treatment at 1800° F. resulted in a loss of approximately 12% of the tungsten contained in the original hard metal product. However, the curve of evaporation is a gradual one and in actual practice a choice can be made between speed of reaction and loss by volatilization.

If the oxidation is carried out for a time insufficient for the particular operating temperature utilized, the pieces of treated material will have a hard core of solid metal remaining at the end of the oxidation period. This core will be substantially as impervious to subsequent treatment as the original metal pieces and therefore is very undesirable.

After the sintered masses containing tungsten carbide have been exposed to a high temperature as described above, the resulting friable mass may be pulverized in a ball mill, for example, so that it is reduced to a powder. This powder, in turn, may be leached with a suitable acid, such as sulfuric or hydrochloric, the former being preferable because of greater ease in handling. This leaching may alternatively take place during the process of pulverization.

During the leaching step the metallic bond, such as cobalt, is dissolved out to form either cobalt sulfate or cobalt chloride which is soluble in the leaching liquid. The liquid can subsequently be decanted or filtered off and the cobalt recovered by well-known chemical reactions. The residue is relatively pure tungstic oxide which can be further purified by recognized chemical procedures if desired, or used directly as a source material for tungsten metal which may be recovered therefrom by well-known processes.

In the preceding specification and the accompanying drawing there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

It is claimed:

1. A process of recovering tungstic oxide and cobalt from a sintered mass of tungsten carbide admixed with metallic impurities, including cobalt, comprising the steps of heating said mass to a temperature of between 1300° F. and 2000° F. in the presence of air to cause the same to disintegrate and form a loose mass of friable material containing tungstic oxide and metallic impurities, including cobalt, pulverizing said loose mass of friable material, treating said material with an organic acid to form a solution of the cobalt salt of the corresponding inorganic acid employed, and recovering the cobalt from the solution.

2. A process of recovering tungstic oxide from a sintered mass of tungsten carbide bonded with cobalt, comprising the steps of heating said mass to a temperature of between 1300° F. and 2000° F. in the presence of air to cause the same to disintegrate and form a loose mass of friable material containing tungstic oxide and cobalt, pulverizing said loose mass of friable material, treating said material with an excess amount of inorganic acid to form a solution of the cobalt salt of the corresponding inorganic acid employed, and recovering the cobalt from the solution obtained from said acid treatment.

3. A process of recovering tungstic oxide from a sintered mass of tungsten carbide, comprising the steps of heating said mass to a temperature ranging between approximately 1400° F. and 1600° F. for a period of time ranging between approximately 24 hours and approximately 4 hours in the presence of air to cause the same to disintegrate and form a loose mass of friable material containing tungstic oxide and metallic impurities, including cobalt, pulverizing said loose mass of friable material, treating said material with an inorganic acid to form a solution of the cobalt salt of the corresponding inorganic acid employed, and recovering the cobalt from the solution.

4. A process of recovering tungsten and metallic impurities from a sintered mass of tungsten carbide comprising the steps of heating said mass to a temperature of between about 1300° F. and 2000° F. in an oxidising atmosphere to cause the same to disintegrate and form a loose mass of friable material containing tungstic oxide and metallic impurities, and treating said loose mass of friable material with an inorganic acid for the removal of the metallic impurities.

5. A process of recovering tungsten and metallic impurities from a sintered mass of tungsten carbide comprising the steps of heating said mass to a temperature of between about 1600° F. and 1800° F. in an oxidising atmosphere to cause the same to disintegrate and form a loose mass of friable material containing tungstic oxide and metallic impurities, and treating said loose mass of friable material with an inorganic acid for the removal of the metallic impurities.

References Cited in the file of this patent

UNITED STATES PATENTS

| | | |
|---|---|---|
| 2,485,175 | Trapp | Oct. 18, 1949 |
| 2,270,527 | Kinzie et al. | Jan. 20, 1942 |